United States Patent
Clingman

(10) Patent No.: US 8,047,233 B2
(45) Date of Patent: Nov. 1, 2011

(54) APPARATUS AND METHOD FOR GENERATING VORTEXES IN FLUID FLOW ADJACENT TO A SURFACE

(75) Inventor: Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 999 days.

(21) Appl. No.: 11/939,680

(22) Filed: Nov. 14, 2007

(65) Prior Publication Data

US 2009/0120205 A1    May 14, 2009

(51) Int. Cl.
*F15C 1/16* (2006.01)

(52) U.S. Cl. ............. 137/809; 244/99.8; 244/199.1; 244/200.1; 244/204.1

(58) Field of Classification Search .......... 137/808, 137/809; 244/99.8, 199.1, 200.1, 204.1
See application file for complete search history.

(56) References Cited

U.S. PATENT DOCUMENTS

| | | | |
|---|---|---|---|
| 5,755,408 | A | 5/1998 | Schmidt et al. |
| 5,785,282 | A | 7/1998 | Wake et al. |
| 6,105,904 | A | 8/2000 | Lisy et al. |
| 6,685,143 | B1 | 2/2004 | Prince et al. |
| 2004/0129838 | A1 | 7/2004 | Lisy et al. |
| 2007/0018056 | A1* | 1/2007 | Narramore .......... 244/200.1 |
| 2008/0092354 | A1* | 4/2008 | Clingman et al. ........ 29/25.35 |
| 2008/0100179 | A1* | 5/2008 | Ruggeri et al. ............ 310/332 |

FOREIGN PATENT DOCUMENTS

| JP | 05016892 | 10/1993 |
|---|---|---|
| WO | 2007005687 A1 | 1/2007 |

OTHER PUBLICATIONS

Clingman, Dan J.; "Development of an Aerodynamic Synthetic Jet Actuator Based on a Piezoelectric Buckled Beam"; Master's of Science in Aerospace Engineering Degree Thesis; University of Maryland; Feb. 2006.
PCT International Search Report; PCT Application US2008/078330; filed Sep 30, 2008; Report Date Mar. 9, 2009.
Barrett, Ron & Farokhi, Saeed; "Subsonic Aerodynamics and Performance of a Smart Vortex Generator System"; Journal of Aircraft; vol. 33, No. 2, Mar.-Apr. 1996; pp. 393-398.
Lin, J.C.; "AIAA 99/3404 Control of Turbulent Boundary-Layer Separation Using Micro-Vortex Generators"; 30th AIAA Fluid Dynamics Conference; Jun. 28-Jul. 1, 1999; Norfolk, VA.
Osborn, Russell F.; Kota, Sridhar; Hetrick, Joel A.; Geister, Donald E.; Tilmann, Carl P. & Joo, Jinyong; "Active Flow Control Using High-Frequency Compliant Structures"; Journal of Aircraft; vol. 41, No. 3, May-Jun. 2004; pp. 603-609.

* cited by examiner

*Primary Examiner* — Craig M Schneider
(74) *Attorney, Agent, or Firm* — Law Office of Donald D. Mondul

(57) ABSTRACT

An apparatus for generating vortexes in fluid flow generally adjacent to a surface includes: (a) at least one vortex generating element; and (b) a piezoelectric motor element coupled with the at least one vortex generating element. The piezoelectric motor element responds to a varying voltage signal to move the at least one vortex generating element between a first position extending into the fluid flow an operating distance from the surface and a second position generally flush with the surface.

11 Claims, 3 Drawing Sheets

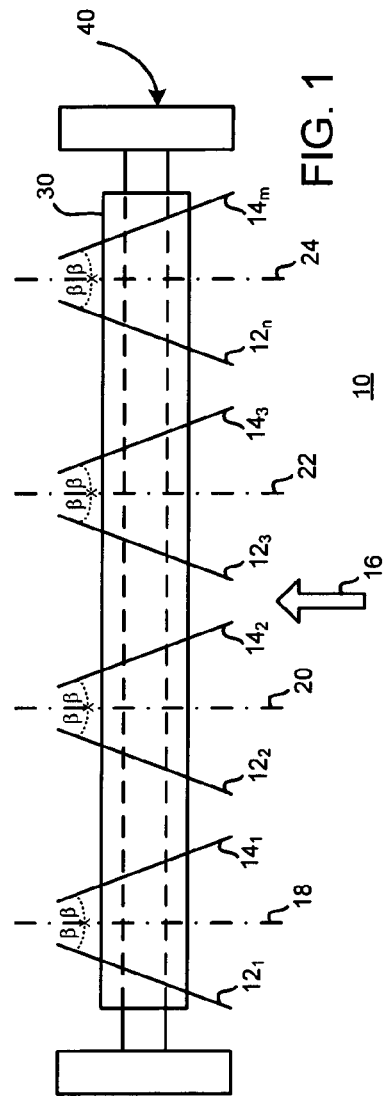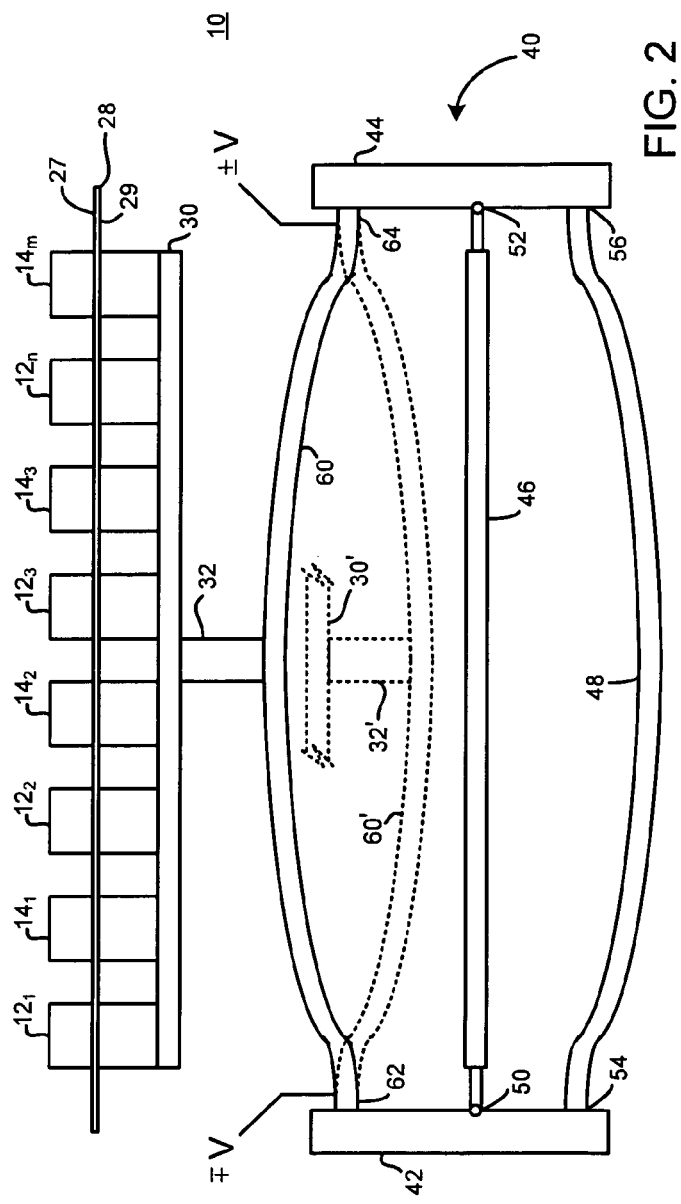

APPARATUS AND METHOD FOR GENERATING VORTEXES IN FLUID FLOW ADJACENT TO A SURFACE

FIELD OF THE INVENTION

The present invention is directed to apparatuses and methods for affecting fluid flow adjacent to a surface, and especially to apparatuses and methods for generating vortexes in fluid flow adjacent to a surface.

BACKGROUND

Vortex generating elements may be employed with aircraft, ships or ground vehicles to reattach separated fluid flow across exterior surfaces. Reattaching fluid flow across exterior surfaces may improve control characteristics, decrease transonic drag and generally fine tune vehicle performance in a specific operating regime. Use of vortex generating units may be referred to as active flow control. Active flow control may advantageously deploy vortex generating elements in a fluid stream adjacent to a surface, such as in the boundary layer of the fluid flow, at a locus upstream of the area of detached fluid flow. Vortex generating elements may be deployed only during certain evolutions such as, by way of example and not by way of limitation, during a steep climb, landing, take-off or transonic operation of an aircraft. Vortex generating elements may be deployed intermittently at a frequency that advantageously affects downstream attached fluid flow.

There is a need for precise and rapid control of deployment of vortex generating elements to permit accurately effecting active flow control for a vehicle.

SUMMARY

An apparatus for generating vortexes in fluid flow generally adjacent to a surface includes: (a) at least one vortex generating element; and (b) a piezoelectric motor element coupled with the at least one vortex generating element. The piezoelectric motor element responds to a varying voltage signal to move the at least one vortex generating element between a first position extending into the fluid flow an operating distance from the surface and a second position generally flush with the surface.

A method for generating vortexes in fluid flow generally adjacent to a surface includes: (a) In no particular order: (1) providing at least one vortex generating element; and (2) providing a piezoelectric motor element coupled with the at least one vortex generating element. (b) Operating the piezoelectric motor element responsive to a varying voltage signal to move the at least one vortex generating element between a first position extending into the fluid flow an operating distance from the surface and a second position generally flush with the surface.

Therefore, it is a feature of the present disclosure to provide precise and rapid control of deployment of vortex generating elements to permit accurately effecting active flow control for a vehicle.

Further features of the present disclosure will be apparent from the following specification and claims when considered in connection with the accompanying drawings, in which like elements are labeled using like reference numerals in the various figures, illustrating embodiments of the disclosure.

BRIEF DESCRIPTION OF THE DRAWINGS

FIG. 1 is a top plan view of the apparatus of the present disclosure.

FIG. 2 is a side elevation view of the apparatus illustrated in FIG. 1.

DETAILED DESCRIPTION OF THE PREFERRED EMBODIMENT

Figure 3:
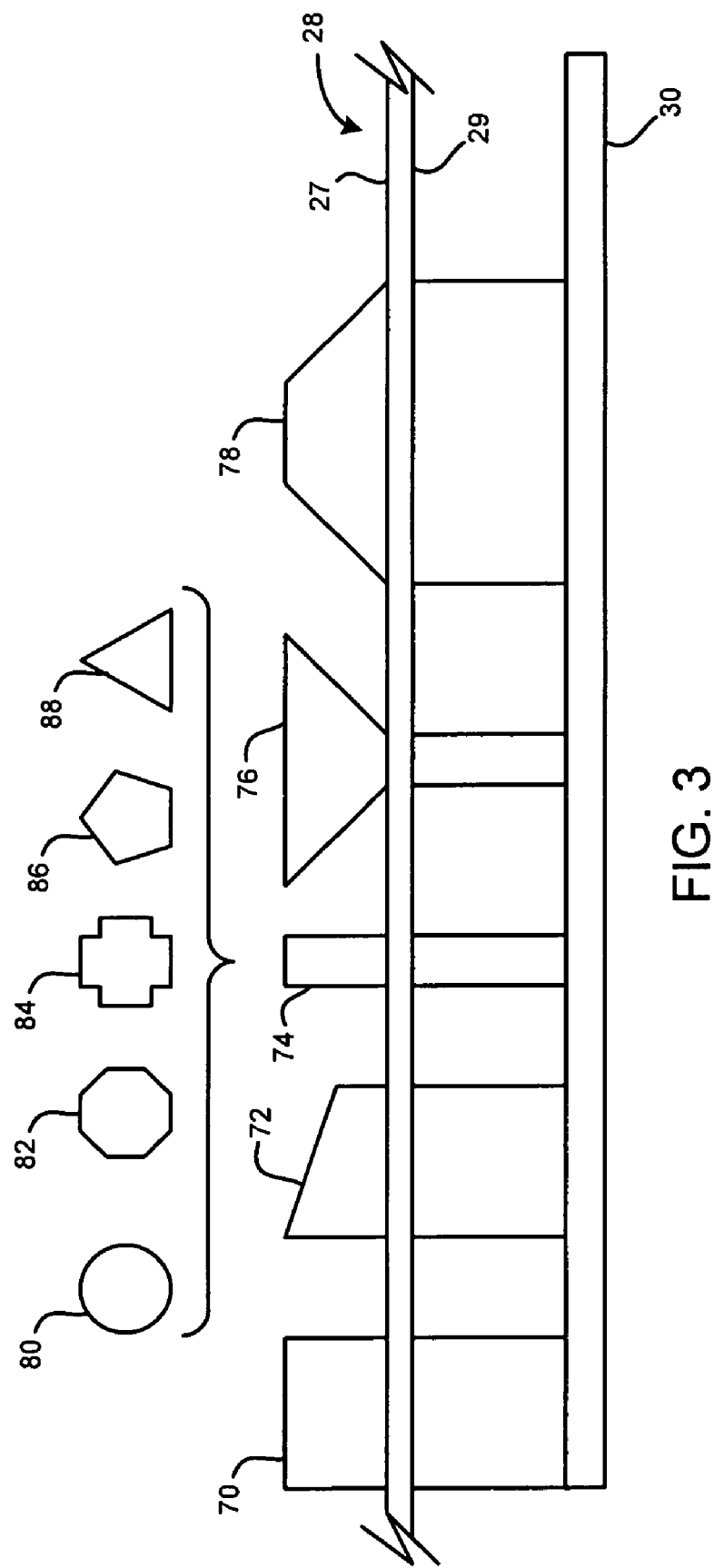
FIG. 3 illustrates representative configurations for vortex generating elements useful with the apparatus of the present disclosure.

FIG. 1 is a top plan view of the apparatus of the present disclosure. In FIG. 1, a vortex generating apparatus 10 for affecting fluid flow adjacent to a surface may include a motor element 40, first vortex generating elements $12_1, 12_2, 12_3, 12_n$ and second vortex generating elements $14_1, 14_2, 14_3, 14_m$. Motor element 40 may be coupled with first vortex generating elements $12_1, 12_2, 12_3, 12_n$ and second vortex generating elements $14_1, 14_2, 14_3, 14_m$ via a common carrier element 30. The indicators "n" and "m" are employed to signify that there can be any number of vortex generating elements in vortex generating apparatus 10. The inclusion of four first vortex generating elements $12_1, 12_2, 12_3, 12_n$ and four second vortex generating elements $14_1, 14_2, 14_3, 14_m$ in FIG. 1 is illustrative only and does not constitute any limitation regarding the number of vortex generating elements that may be included in the vortex generating apparatus of the present invention.

Fluid flow in FIG. 1 may be in a direction indicated by an arrow 16. Fluid flow past first vortex generating element $12_1$ may thereby be oriented substantially about a flow axis 18. Fluid flow past first vortex generating element $12_2$ may be oriented substantially about a flow axis 20 parallel with flow axis 18. Fluid flow past first vortex generating element $12_3$ may be oriented substantially about a flow axis 22 parallel with flow axis 18. Fluid flow past first vortex generating element $12_n$ may be oriented substantially about a flow axis 24 parallel with flow axis 18.

Each of first vortex generating elements $12_n$ may be angularly displaced to the left in FIG. 1 from a respective axis 18, 20, 22, 24 by an acute angle $\beta$.

Fluid flow past second vortex generating element $14_1$ may thereby be oriented substantially about flow axis 18. Fluid flow past second vortex generating element $14_2$ may be oriented substantially about flow axis 20. Fluid flow past second vortex generating element $14_3$ may be oriented substantially about flow axis 22. Fluid flow past second vortex generating element $14_m$ may be oriented substantially about flow axis 24.

Each of first vortex generating elements $14_m$ may be angularly displaced to the right in FIG. 1 from a respective axis 18, 20, 22, 24 by acute angle $\beta$ or by another acute angle.

Vortex generating apparatus 10 may employ only first vortex generating elements $12_n$, may employ only vortex generating elements $14_m$, may employ all of vortex generating elements $12_n, 14_m$ or may employ another combination of vortex generating elements $12_n, 14_m$.

FIG. 2 is a side elevation view of the apparatus illustrated in FIG. 1. In FIG. 2, vortex generating elements $12_n, 14_m$ are illustrated in a deployed orientation extending through an enclosure 28. Enclosure 28 presents an outer surface 27 and an inner surface 29. Vortex generating elements $12_n, 14_m$ may traverse enclosure 28 through apertures or slots in enclosure 28 extending from inner surface 29 to outer surface 27 (apertures not shown). Vortex generating elements $12_n, 14_m$ may be attached with a common carrier element 30. Carrier element 30 may be coupled with motor element 40 via a connector element 32.

Motor element 40 may be configured as a piezoelectric motor element having a first tilt plate 42 movably coupled with a base member 46 at a first base connection locus 50, and having a second tilt plate 44 movably coupled at a second base connection locus 52 with base member 46. A buckled beam bias member 48 may be coupled with tilt plate 42 at a first bias locus 54 displaced from base connection locus 50. Buckled beam bias member 48 may also be coupled with tilt plate 44 at a second bias locus 56 displaced from base connection locus 52.

Motor element 40 may further include a piezoelectric element 60. Piezoelectric element 60 may be a bimorph piezoelectric element. A bimorph piezoelectric element may be a piezoelectric element having two active layers that produce a displacement of the element causing one active layer to extend and the other active layer to contract in response to an electrical signal applied to the element.

Piezoelectric element 60 may rest at a first position (indicated as piezoelectric element 60 in solid line format in FIG. 2) when an electrical signal +V is applied at a first terminus 62 of piezoelectric element 60 and an electrical signal −V is applied at a second terminus 64 of piezoelectric element 60. When in the first position, connector element 32 may urge carrier element 30 toward enclosure 28, vortex generating elements $12_n$, $14_m$ may pass through apertures (not shown) in enclosure 28 to extend beyond outer surface 27 into the fluid flow along outer surface 27 (see arrow 16; FIG. 1).

Piezoelectric element 60 may rest at a second position indicated as piezoelectric element 60' in dotted line format in FIG. 2) when an electrical signal −V is applied at first terminus 62 of piezoelectric element 60 and an electrical signal +V is applied at second terminus 64 of piezoelectric element 60. Elements of motor element 40 in the second position of piezoelectric element 60 are indicated in dotted line format in FIG. 2 and designated using a "prime" notation. When in the second position, connector element 32' may urge carrier element 30' away from enclosure 28, vortex generating elements $12_n$, $14_m$ may retract through apertures (not shown) in enclosure 28 to an orientation substantially flush with outer surface 27. In order to avoid cluttering FIG. 2, only a portion of carrier element 30' (carrier element in the second position of piezoelectric element 60') is included in FIG. 2.

The first position of piezoelectric element 60 may be referred to as a first equilibrium position, and the second position of piezoelectric element 60' may be referred to as a second equilibrium position.

Biasing piezoelectric element 60 using bias element 48 in cooperation with tilt plates 42, 44 and base member 46 permits motor element 40 to present enhanced displacement of piezoelectric element 60 in response to voltage signals applied at termini 62, 64. Operation of motor element 40 may be described in detail in co-pending U.S. patent application Ser. No. 11/584,305 filed Oct. 20, 2006 for "ENHANCED DISPLACEMENT PIEZOELECTRIC MOTOR" and assigned to the assignee of the present application. Directly coupling carrier element 30 with piezoelectric element 60 without any intervening transmission element permits rapid deployment of vortex generating elements $12_n$, $14_m$ controlled by voltage signals applied to piezoelectric element 60. Eliminating a transmission element also may result in reduced cost and smaller size for vortex generating apparatus 10 as compared with other vortex generating apparatuses having similar operating characteristics.

FIG. 3 illustrates representative configurations for vortex generating elements useful with the apparatus of the present disclosure. In FIG. 3, a variety of exemplary shapes that may be employed as vortex generating elements are illustrated coupled with a carrier element 30 in a deployed orientation for affecting fluid flow adjacent to an outer surface 27 of an enclosure 28. It may not be advantageous to employ differently-shaped vortex generating elements in a single application; different configurations are illustrated in FIG. 3 attached to a common carrier element 30 for purposes of illustration only.

A rectangular vortex generating element 70 is similar in construction to vortex generating elements $12_n$, $14_m$ (FIG. 2). A sloped rectangular vortex generating element 72 may be advantageously oriented to present a lower leading profile upstream into a fluid flow. Vortex generating element 74 may be a rod-shaped element. Vortex generating element 76 may be a Y-profile element. Vortex generating element 78 may be a truncated pyramid profile element.

Rod-shaped vortex generating element 74 may have any of several cross-section shapes. Cross-section of rod-shaped element 74 may be a substantially circular shape 80; an oval shape (not shown); a polygonal such as, by way of illustration and not by way of limitation, an octagonal shape 82, a "cross" shape 84, a pentagonal shape 86 or a triangular shape 88; or another shape.

Figure 4:
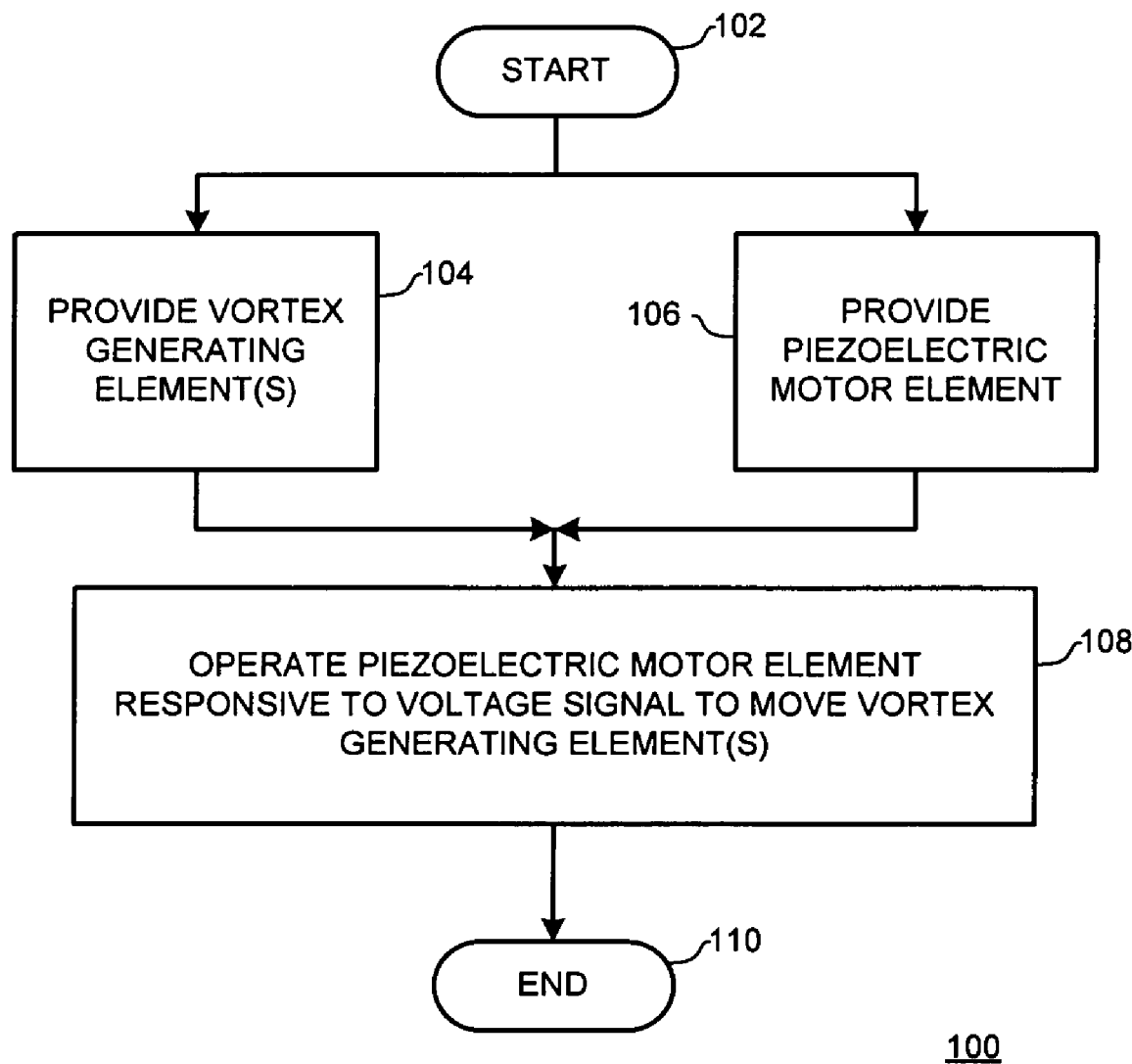
FIG. 4 is a flow chart illustrating the method of the present disclosure.

FIG. 4 is a flow chart illustrating the method of the present disclosure. In FIG. 4, a method 100 for generating vortexes in fluid flow generally adjacent to a surface begins at a START locus 102. Method 100 may continue with, in no particular order: (1) providing at least one vortex generating element, as indicated by a block 104; and (2) providing a piezoelectric motor element coupled with the at least one vortex generating element, as indicated by a block 106.

Method 100 may continue with operating the piezoelectric motor element responsive to a varying voltage signal to move the at least one vortex generating element between a first position extending into the fluid flow an operating distance from the surface and a second position generally flush with the surface, as indicated by a block 108. Method 100 may terminate at an END locus 110.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims.

I claim:

1. An apparatus for generating vortexes in fluid flow generally adjacent to a surface; the apparatus comprising:
   (a) at least one vortex generating element; and
   (b) a piezoelectric motor element coupled with said at least one vortex generating element; said piezoelectric motor element responding to a varying voltage signal to move said at least one vortex generating element between a first position extending into said fluid flow an operating distance from said surface and a second position generally flush with said surface; said piezoelectric motor element including a bimorph piezoelectric element coupled for receiving said voltage signal and a buckled beam bias element coupled for biasing said piezoelectric element to either of a first stable position and a second stable position in response to said voltage signal; said at least one vortex generating element being in said first position when said piezoelectric element is in said first stable position; said at least one vortex generating element being in said second position when said piezoelectric element is in said second stable position.

2. An apparatus for generating vortexes in fluid flow generally adjacent to a surface as recited in claim 1 wherein said at least one vortex generating element is a plurality of generally planar elements affixed with a common carrier element; said plurality of generally planar elements extending into said fluid flow at an acute angle with said fluid flow in said first position; said piezoelectric motor element being coupled with said common carrier element.

3. An apparatus for generating vortexes in fluid flow generally adjacent to a surface as recited in claim 1 wherein said at least one vortex generating element is a plurality of generally planar elements affixed with a common carrier element; said fluid flow occurring generally along a fluid flow axis; a first element group of said plurality of generally planar elements extending into said fluid flow substantially in a parallel orientation at a first acute angle in a first direction from said fluid flow axis in said first position; a second element group of said plurality of generally planar elements extending into said fluid flow substantially in a parallel orientation at a second acute angle in a second direction from said fluid flow axis in said first position; said piezoelectric motor element being coupled with said common carrier element.

4. An apparatus for generating vortexes in fluid flow generally adjacent to a surface as recited in claim 1 wherein said at least one vortex generating element is a plurality of generally rod-shaped elements affixed with a common carrier element; said plurality of rod-shaped elements extending into said fluid flow in said first position; said piezoelectric motor element being coupled with said common carrier element.

5. An apparatus for affecting fluid flow generally adjacent to an exterior surface; the apparatus comprising:
(a) a plurality of vortex generating elements attached with a carrier element; said carrier element being situated generally proximate to an interior surface substantially adjacent to said exterior surface; and
(b) a piezoelectric motor element coupled with said carrier element; said piezoelectric motor element responding to a voltage signal to move said carrier element between a first position and a second position; said plurality of vortex generating elements extending through said interior surface and said exterior surface into said fluid flow an operating distance from said exterior surface when said carrier element is in said first position; said plurality of vortex generating elements being generally flush with said exterior surface or below said exterior surface when said carrier element is in said second position; said piezoelectric motor element including a bimorph piezoelectric element coupled for receiving said voltage signal and a buckled beam bias element coupled for biasing said piezoelectric element to either of a first stable equilibrium position and a second stable equilibrium position in response to said voltage signal; said carrier element being in said first position when said piezoelectric element is in said first stable equilibrium position; said carrier element being in said second position when said piezoelectric element is in said second stable equilibrium position.

6. An apparatus for affecting fluid flow generally adjacent to an exterior surface as recited in claim 5 wherein said plurality of vortex generating elements is a plurality of generally planar elements; said fluid flow occurring generally along a fluid flow axis; said plurality of generally planar elements extending into said fluid flow substantially in a parallel orientation at an acute angle with said fluid flow axis when said carrier element is in said first position.

7. An apparatus for affecting fluid flow generally adjacent to an exterior surface as recited in claim 5 wherein said plurality of vortex generating elements is a plurality of generally planar elements; said fluid flow occurring generally along a fluid flow axis; a first element group of said plurality of generally planar elements extending into said fluid flow substantially in a parallel orientation at a first acute angle in a first direction from said fluid flow axis in said first position; a second element group of said plurality of generally planar elements extending into said fluid flow substantially in a parallel orientation at a second acute angle in a second direction from said fluid flow axis when said carrier element is in said first position.

8. An apparatus for affecting fluid flow generally adjacent to an exterior surface as recited in claim 5 wherein said plurality of vortex generating elements is a plurality of generally rod-shaped elements; said plurality of rod-shaped elements extending into said fluid flow when said carrier element is in said first position.

9. A method for generating vortexes in fluid flow generally adjacent to a surface; the method comprising:
(a) in no particular order:
(1) providing at least one vortex generating element; and
(2) providing a piezoelectric motor element coupled with said at least one vortex generating element; and
(b) operating said piezoelectric motor element responsive to a varying voltage signal to move said at least one vortex generating element between a first position extending into said fluid flow an operating distance from said surface and a second position generally flush with said surface; said piezoelectric motor element including a bimorph piezoelectric element coupled for receiving said voltage signal and a buckled beam bias element coupled for biasing said piezoelectric element to either of a first stable equilibrium position and a second stable equilibrium position in response to said voltage signal; said at least one vortex generating element being in said first position when said piezoelectric element is in said first stable equilibrium position; said at least one vortex generating element being in said second position when said piezoelectric element is in said second stable equilibrium position.

10. A method for generating vortexes in fluid flow generally adjacent to a surface as recited in claim 9 wherein said at least one vortex generating element is a plurality of generally planar elements affixed with a common carrier element; said fluid flow occurring generally along a fluid flow axis; said plurality of generally planar elements extending into said fluid flow substantially in a parallel orientation at an acute angle with said fluid flow axis in said first position; said piezoelectric motor element being coupled with said common carrier element.

11. A method for generating vortexes in fluid flow generally adjacent to a surface as recited in claim 9 wherein said at least one vortex generating element is a plurality of generally planar elements affixed with a common carrier element; said fluid flow occurring generally along a fluid flow axis; a first element group of said plurality of generally planar elements extending into said fluid flow substantially in a parallel orientation at a first acute angle in a first direction from said fluid flow axis in said first position; a second element group of said plurality of generally planar elements extending into said fluid flow substantially in a parallel orientation at a second acute angle in a second direction from said fluid flow axis in said first position; said piezoelectric motor element being coupled with said common carrier element.

* * * * *